(12) United States Patent
Kim et al.

(10) Patent No.: US 9,762,896 B2
(45) Date of Patent: Sep. 12, 2017

(54) 3D DISPLAY DEVICE AND METHOD FOR CONTROLLING THE SAME

(71) Applicant: LG ELECTRONICS INC., Seoul (KR)

(72) Inventors: Jayoen Kim, Seoul (KR); Kyoungha Lee, Seoul (KR); Youngkyung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 14/651,581

(22) PCT Filed: Apr. 18, 2013

(86) PCT No.: PCT/KR2013/003288
§ 371 (c)(1),
(2) Date: Jun. 11, 2015

(87) PCT Pub. No.: WO2014/148673
PCT Pub. Date: Sep. 25, 2014

(65) Prior Publication Data
US 2015/0341626 A1 Nov. 26, 2015

(30) Foreign Application Priority Data
Mar. 18, 2013 (KR) .................. 10-2013-0028835

(51) Int. Cl.
*H04N 13/04* (2006.01)
*H04N 21/422* (2011.01)
(Continued)

(52) U.S. Cl.
CPC ..... *H04N 13/0484* (2013.01); *H04N 13/0278* (2013.01); *H04N 13/0468* (2013.01);
(Continued)

(58) Field of Classification Search
CPC .......... H04N 13/0484; H04N 13/0468; H04N 13/0278; H04N 21/44218
See application file for complete search history.

(56) References Cited

U.S. PATENT DOCUMENTS

2008/0246753 A1 10/2008 Amroun et al.
2011/0149043 A1 6/2011 Koh et al.
(Continued)

FOREIGN PATENT DOCUMENTS

CN 101788876 A 7/2010
CN 102187681 A 9/2011
(Continued)

*Primary Examiner* — Nam Pham
(74) *Attorney, Agent, or Firm* — Birch, Stewart, Kolasch & Birch, LLP

(57) ABSTRACT

A device and a method for controlling the same are disclosed, in which a user may control a 3D display device more conveniently and exactly. The 3D display device comprises a 3D display unit a measurement unit configured to obtain location information indicating a location of a user located in front of the 3D display unit, and a processor configured to control the 3D display unit and the measurement unit, wherein the processor obtains a first angle, which is a horizontal angle between the 3D display unit and the user, by using the location information, maintains an image displayed on the 3D display unit if the first angle is within a preset first angle range, and rotates the image displayed on the 3D display unit based on a vertical axis of the image and in a left or right direction according to the first angle if the first angle departs from the preset first angle range.

19 Claims, 10 Drawing Sheets

(51) Int. Cl.
  *H04N 21/4223*   (2011.01)
  *H04N 21/431*    (2011.01)
  *H04N 21/442*    (2011.01)
  *H04N 21/81*     (2011.01)
  *H04N 13/02*     (2006.01)

(52) U.S. Cl.
  CPC ... *H04N 21/4223* (2013.01); *H04N 21/42202* (2013.01); *H04N 21/4318* (2013.01); *H04N 21/44218* (2013.01); *H04N 21/816* (2013.01)

(56) References Cited

U.S. PATENT DOCUMENTS

| | | |
|---|---|---|
| 2012/0092466 A1 | 4/2012 | Choi |
| 2012/0176371 A1 | 7/2012 | Morifuji et al. |
| 2013/0023342 A1 | 1/2013 | Jung et al. |
| 2013/0027517 A1* | 1/2013 | Kim .................. H04N 13/0468 348/46 |

FOREIGN PATENT DOCUMENTS

| | | |
|---|---|---|
| CN | 102804786 A | 11/2012 |
| KR | 10-0560464 B1 | 3/2006 |
| WO | WO 2012/176109 A1 | 12/2012 |
| WO | WO 2013/012146 A1 | 1/2013 |

* cited by examiner (1)

3D DISPLAY DEVICE AND METHOD FOR CONTROLLING THE SAME

TECHNICAL FIELD

The present specification relates to a 3D display device and a method for controlling the same, and more particularly, to a device for controlling an image displayed on a 3D display to allow a user to enter a sweet spot of the 3D display by himself/herself if a location of the user departs from the sweet spot of the 3D display.

BACKGROUND ART

With the development of the electronic technology, various types of electronic devices have been developed and spread. In this respect, manufacturers that have manufactured and sold electronic devices have been required to provide guidelines for a method for using an electronic device to allow users to well use functions of the electronic device. To this end, conventional manuals have been drafted in such a manner that illustrations and texts are together stated per function or contents of the product. Accordingly, the users could have used the corresponding device effectively only if the user studies the functions of the electronic device for a long time. Also, if the user desires to know a desired function, there was inconvenience in that the user should find out description of the desired function by checking a table of contents suggested at the beginning of the guidelines. Also, there was inconvenience in that the user should read full description of a specific function even when the user desires to briefly know the specific function. Accordingly, a method for providing guidelines to provide convenience of a user will be required to allow the user to use an electronic device more conveniently and easily.

DISCLOSURE OF INVENTION

Technical Problem

Accordingly, the present specification is directed to a 3D display device and a method for controlling the same, which substantially obviate one or more problems due to limitations and disadvantages of the related art.

An object of the present specification is to provide a 3D display device and a method for controlling the same, which may measure a location of a user.

Another object of the present specification is to provide a 3D display device and a method for controlling the same, which rotates an image displayed on a 3D display in accordance with a location of a user.

Still another object of the present specification is to provide a 3D display device and a method for controlling the same, which enlarges or reduces an image displayed on a 3D display in accordance with a location of a user.

Further still another object of the present specification is to provide a 3D display device and a method for controlling the same, which may provide a sweet spot that may be registered by setup of a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the specification, as embodied and broadly described herein, a 3-dimensional (3D) display device comprises a 3D display unit, a measurement unit configured to obtain location information indicating a location of a user located in front of the 3D display unit, and a processor configured to control the 3D display unit and the measurement unit, wherein the processor obtains a first angle, which is a horizontal angle between the 3D display unit and the user, by using the location information, maintains an image displayed on the 3D display unit if the first angle is within a preset first angle range, and rotates the image displayed on the 3D display unit based on a vertical axis of the image and in a left or right direction the first angle if the first angle departs from the first angle range.

Advantageous Effects of Invention

According to one embodiment of the present specification, if the distance between the 3D display unit and the user departs from the distance range which is preset, the image displayed on the 3D display unit may be enlarged or reduced to allow the user to move to the sweet spot by himself/herself.

Also, according to another embodiment of the present specification, if the user departs from the sweet spot, the image displayed on the 3D display unit may be rotated in an opposite direction of the movement direction of the user, so that the user may enter the sweet spot by himself/herself, whereby more intuitive easy viewing guidelines may be provided.

Also, according to other embodiment of the present specification, since the sweet spot may be set by the user, the optimized sweet spot may be provided to each user.

It is to be understood that both the foregoing general description and the following detailed description of the present specification are exemplary and explanatory and are intended to provide further explanation of the specification as claimed.

BRIEF DESCRIPTION OF DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 12b is a flow chart illustrating a method for controlling a device if an angle of a user and the device departs from a distance range of a sweet spot.

BEST MODE FOR CARRYING OUT THE INVENTION

Figure 1:
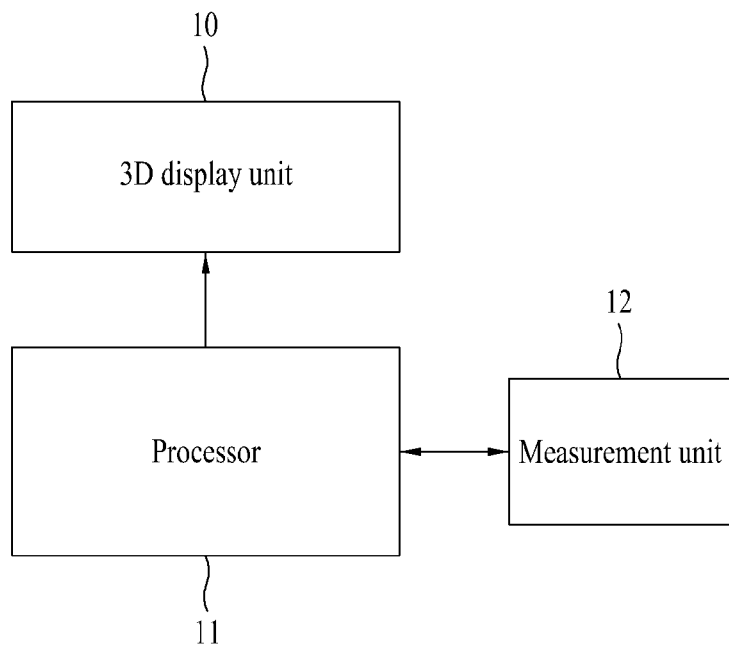
FIG. 1 is a block diagram illustrating a 3D display device according to one embodiment of the present specification.

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Hereinafter, although the embodiments will be described with reference to the accompanying drawings and disclosures disclosed in the drawings, technical spirits of the present specification are not limited by such embodiments.

This specification relates to a 3D display device that provides 3D image. The 3D display device means a digital device that provides a 3D effect by rendering two different images, that is, an image for a right eye and an image for a left eye of a viewer. In other words, if binocular disparity occurs, the viewer may recognize 3D image or 3D screen through binocular disparity. Also, in this specification, the 3D image means image or moving image displayed to allow a user to recognize 3D effect or depth effect. Hereinafter, the digital device that provides the 3D image will be referred to as a 3D display device or a device.

The 3D display device may be divided into a glass type 3D display device and a glassless type 3D display device. The glass type 3D display device may be divided into an anaglyphic 3D display device, a polarization 3D display device, and an alternate-frame sequencing 3D display device. The glassless type 3D display device may be divided into a parallax barrier type 3D display device, a lenticular lens type 3D display device, and a holographic type 3D display device. In addition, the 3D display device disclosed in this specification may be implemented by all the 3D display technologies that may generate binocular disparity, and is not limited to the aforementioned type technology.

In the meantime, the 3D display device has been described based on the glassless type 3D display device in this specification. However, the 3D display device is not limited to the glassless type 3D display device, and includes the glass type 3D display device.

FIG. 1 is a block diagram illustrating a 3D display device according to one embodiment. In FIG. 1, the 3D display device includes a 3D display unit 10, a measurement unit 12, and a processor 11.

The 3D display unit 10 may display 3D image generated or switched by the device. In more detail, the 3D display unit 10 may display a 3D image having two left and right view points. Also, the 3D display unit 10 may display a 3D image on the basis of contents or application implemented by the processor 11 or a control command of the processor 11. Also, the 3D display unit 10 may display a 3D image controlled by the processor. In more detail, the 3D display unit 10 may display a 3D image rotated at a specific angle or a 3D image which is enlarged or reduced.

The measurement unit 12 may measure a location of a user located at the front of the device by using at least one sensor provided in the device. In more detail, the measurement unit 12 may generate relative location information between the user and the 3D display unit 10 by measuring the location of the user. The location information may include information on a relative distance, horizontal angle and elevation angle between the user and the 3D display unit 10. Also, the location information may include information on absolute location coordinates of the user. The measurement unit 12 may generate location information of the user and transmit the generated location information to the processor, or may transmit the measured result to the processor 11.

The location information of the user may be obtained in various manners. For example, the measurement unit 12 may measure the location of the user by recognizing a location of a face of the user. For another example, the measurement unit 12 may measure the location of the user by recognizing a location of both eyes or pupil of the user. For another example, if the device is the glass type 3D display device, the measurement unit 12 may measure the location of the user by recognizing a location of glasses worn by the user. In this case, the location of the user may mean the relative location with the device or the absolute location of the user. A location measurement method of the user will be described in more detail with reference to FIG. 2.

The measurement unit 12 refers to various sensing means, and may sense various inputs of the user or an environment of the device, and transfer the sensed result to the device to allow the device to perform the operation based on the sensed result. For example, the measurement unit 12 may include various sensing means, which may measure a location of a user, such as an ultrasonic sensor, an infrared sensor, a heat detector, and a camera sensor. The aforementioned sensors may be included in the device as separate elements, or may be incorporated into at least one element.

The processor 11 may process data inside the device. Also, the processor 11 may control the aforementioned units of the device, and may manage data transmission and reception between the units. Also, the processor 11 may receive location information of the user from the measurement unit. Alternatively, the processor 11 may receive measurement information from the measurement unit 12, and may obtain location information of the user by using the received measurement result. The location information of the user may include information on the distance, horizontal angle, and elevation angle between the 3D display unit 10 and the user. The processor 11 may control an image displayed on the 3D display unit 10 by using the location information of the user. In more detail, the processor 11 may rotate the 3D image displayed on the 3D display unit 10, or may enlarge or reduce the 3D image.

In the following description, if each step or operation performed in the portable device is started or proceeds by a user input, assume an input signal generating procedure according to the user input includes an explanation of the aforementioned procedure although it is not explained repeatedly. And, it may express that the processor controls the portable device or the units included in the portable device according to the user input and it may explain in a manner of equating the processor with the portable device.

In the meantime, the 3D display device shown in FIG. 1 is a block diagram according to one embodiment. In FIG. 1, respective blocks are shown to logically identify the elements of the device. Accordingly, the elements of the aforementioned device may be provided as one chip or a plurality of chips in accordance with design of the display device.

Figure 2:
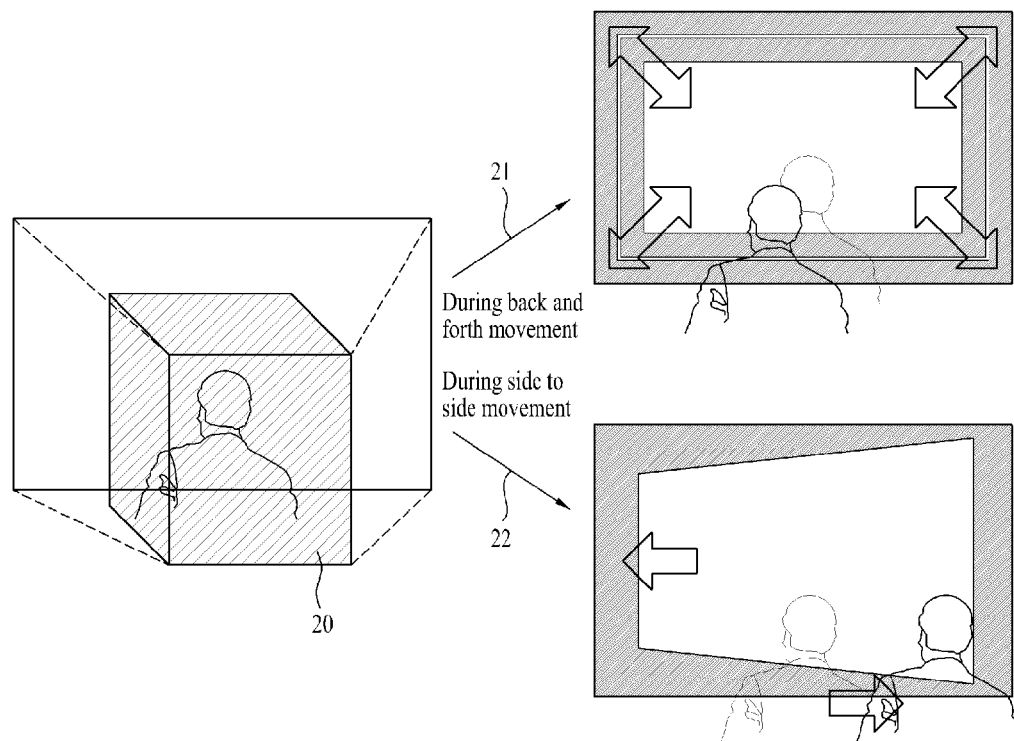
FIG. 2 is a diagram illustrating a 3D display device that provides a sweet spot in accordance with one embodiment of the present specification.

FIG. 2 is a diagram illustrating a 3D display device that provides a sweet spot 20 guide in accordance with one embodiment of the present specification.

When the user views the 3D display device, a sweet spot 20, which corresponds to a specific viewing point, may exist in view of features of 3D image. The sweet spot 20 may mean an optimized viewing point of a 3D image viewing zone at the front of the device. Alternatively, the sweet spot 20 may mean a maximum distance and angle range between the user and the device, which allows the user to recognize depth of the 3D image. The 3D image may be obtained in such a manner that a brain of the user synthesizes different images, which are projected into a left eye and a right eye, into one image. Different images projected into the left eye and the right eye will be referred to as binocular disparity. This binocular disparity may be generated using the relative location of the left eye and the right eye. In other words, the binocular disparity may be generated using the difference in viewing angle or viewing distance between both eyes with respect to the 3D display. In more detail, binocular disparity may be generated in such a manner that a projection distance and angle of displayed left and right eye images are controlled to allow the left eye image to be projected into the left eye and the right eye image to be projected into the right eye. Since the projection distance and angle of both eye images are controlled to allow the left eye image and the right eye image to be separately projected into each eye, the sweet spot 20 where the 3D image may be viewed by the user and a dead zone where the 3D image is not viewed by the user may exist in accordance with the location of the user. Accordingly, the sweet spot 20 may include a specific distance range (axis 'x') and a horizontal angle range (axis 'y'). Alternatively, the sweet spot 20 may further include an elevation angle range (axis 'z') in accordance with one embodiment.

For proper viewing of 3D image, the user needs to view the 3D image within the sweet spot 20. Accordingly, an indicator or guide may be required to allow the user to view 3D image within the sweet spot 20. This specification relates to a user interface for guiding the user to the sweet spot 20. According to one embodiment, if the user is located within the range of the sweet spot 20, the device may maintain an image which is currently being displayed. According to another embodiment, if the user departs from the sweet spot 20, the device may rotate the image which is being displayed, or may enlarge or reduce the image. If the image is rotated (22), the device may rotate the displayed image in an opposite direction of a movement direction of the user. This is intended to restrict viewing of the 3D image by rotating the image in accordance with movement of the user, whereby the user may move to the sweet spot 20 by himself/herself. A method for controlling a displayed image based on the location of the user will be described in more detail with reference to FIG. 7 to FIG. 10.

The 3D display device having the sweet spot 20 has been described as above. As described above, since the device should know the current location of the user to guide the sweet spot 20 for the user, the location measurement method of the user will be described in more detail with reference to FIG. 3.

Figure 3:
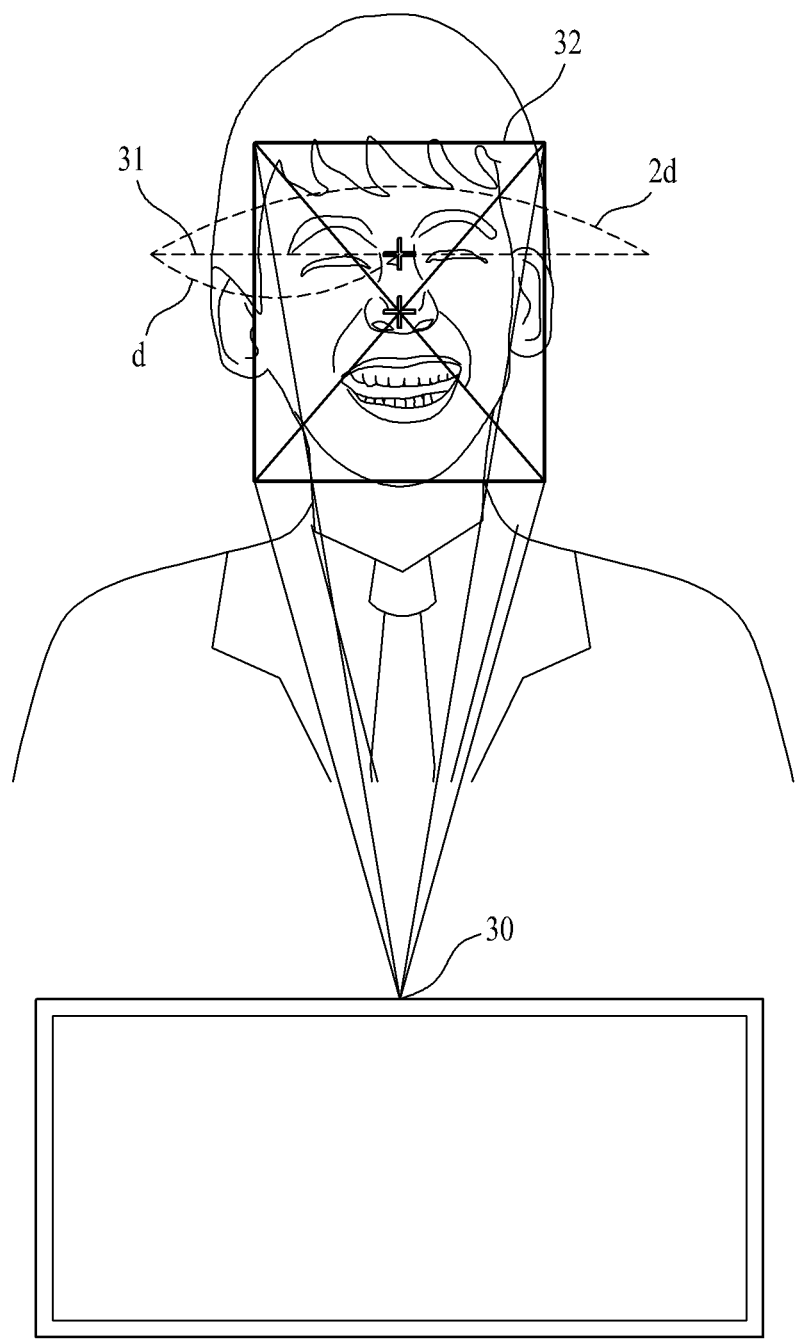
FIG. 3 is a diagram illustrating a 3D display device that measures a location of a user in accordance with one embodiment of the present specification.

FIG. 3 is a diagram illustrating a 3D display device that measures a location of a user in accordance with one embodiment of the present specification. In more detail, FIG. 1 is a diagram illustrating a device that obtains location information of a user as a measurement unit 30 measures the location of the user located in front of the 3D display device.

According to one embodiment, the device may measure the location of the user by recognizing a face 32 of the user through a camera 30. The device may obtain location information of the user by recognizing the face 32 of the user located in a front direction and measuring a relative distance and angle with the user. Alternatively, the device may obtain location information of the user by recognizing the face 32 of the user located in the front direction and measuring an absolute location coordinate of the user.

According to another embodiment, the device may measure the location of the user by recognizing a location of eyes or pupil 31 of the user through the camera 30. The device may obtain the location information of the user by recognizing eyes or pupil 31 of the user located at the front and measuring a relative distance and angle with the user. Alternatively, the device may obtain location information of the user by recognizing eyes or pupil 31 of the user located in the front direction to obtain an absolute relative location coordinate of the user. The location of eyes of the user may be obtained by respectively measuring a left eye and a right eye of the user or measuring a center location 'd' from a location '2d' between the left eye and the right eye.

In addition, the device may obtain the location information of the user by using various sensing means that may measure the location of the user. Acquisition of the location information is not limited to the aforementioned embodiment.

Figure 4:
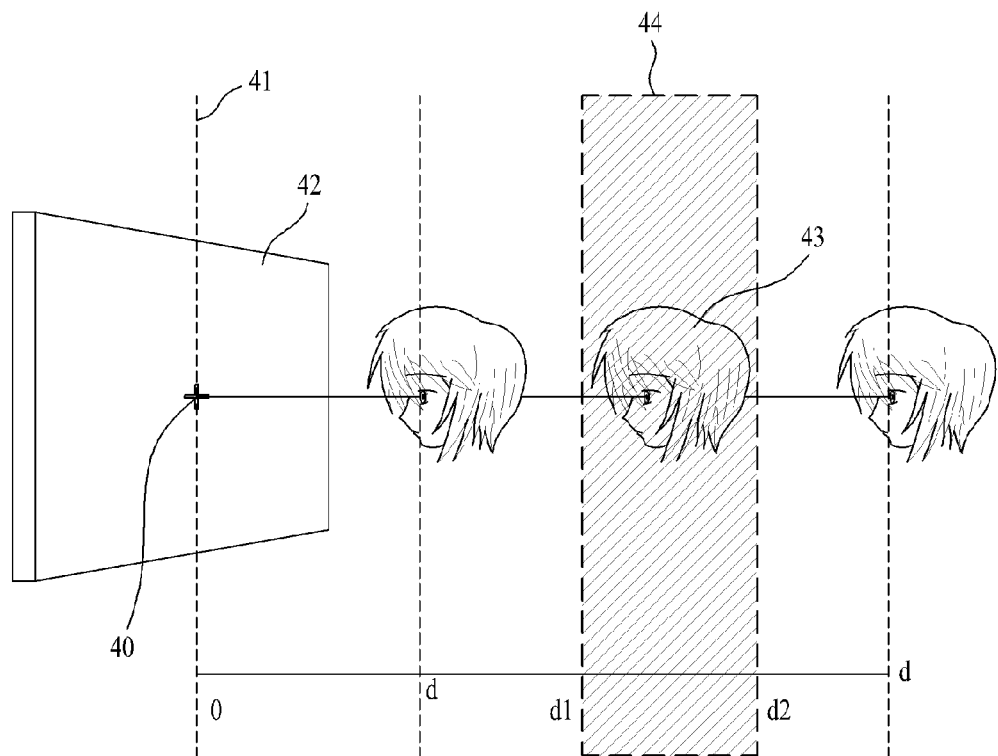
FIG. 4 is a diagram illustrating a 3D display device and a device, which controls an image in accordance with a distance of a user, in accordance with one embodiment of the present specification.

FIG. 4 is a diagram illustrating a 3D display device and a device 42, which controls an image in accordance with a distance of a user 43, in accordance with one embodiment of the present specification. In more detail, FIG. 4 illustrates a distance component of a sweet spot 44 of the device 42. The distance between the device 42 and the user 43 may be obtained from location information measured by the measurement unit.

As described above, the sweet spot 44 where 3D image may be viewed by the user may exist in front of the device 42. In more detail, given distance range d1 to d2 44 that may allow the user to recognize 3D image may exist in front of the device 42. In this specification, the distance 'd' may mean a minimum straight-line distance between the 3D display device 42 and the user 43. According to one embodiment, if the location information of the user 43 is obtained as the face of the user 43 is recognized, the minimum straight-line distance may mean the minimum straight-line distance from a vertical center line 41 of 3D image to a center point of gravity of the face of the user 43. According to another embodiment, if the location information of the user 43 is obtained as both eyes of the user 43 are recognized, the minimum straight-line distance may mean the minimum straight-line distance from the vertical center line 41 of the 3D image to a center point of both eyes of the user 43. In addition, the distance between the user and the 3D display device 42 may be measured in accordance with various manners and references without limitation to the aforementioned embodiments.

Supposing that the minimum value of the distance range of the sweet spot 44 is d1 and the maximum value of the distance range of the sweet spot 44 is d2, if the user 43 is located within the distance range of d1 to d2 from the device 42, the user 43 may view the 3D image. In this case, d1 and d2 may be fixed values in accordance with a design scheme of the device 42, or may be flexible values that may be set by the user 43. In this specification, d1 and d2 are flexible values that may be set by the user 43, and the method for setting d1 and d2 will be described later with reference to FIG. 11.

Figure 5:
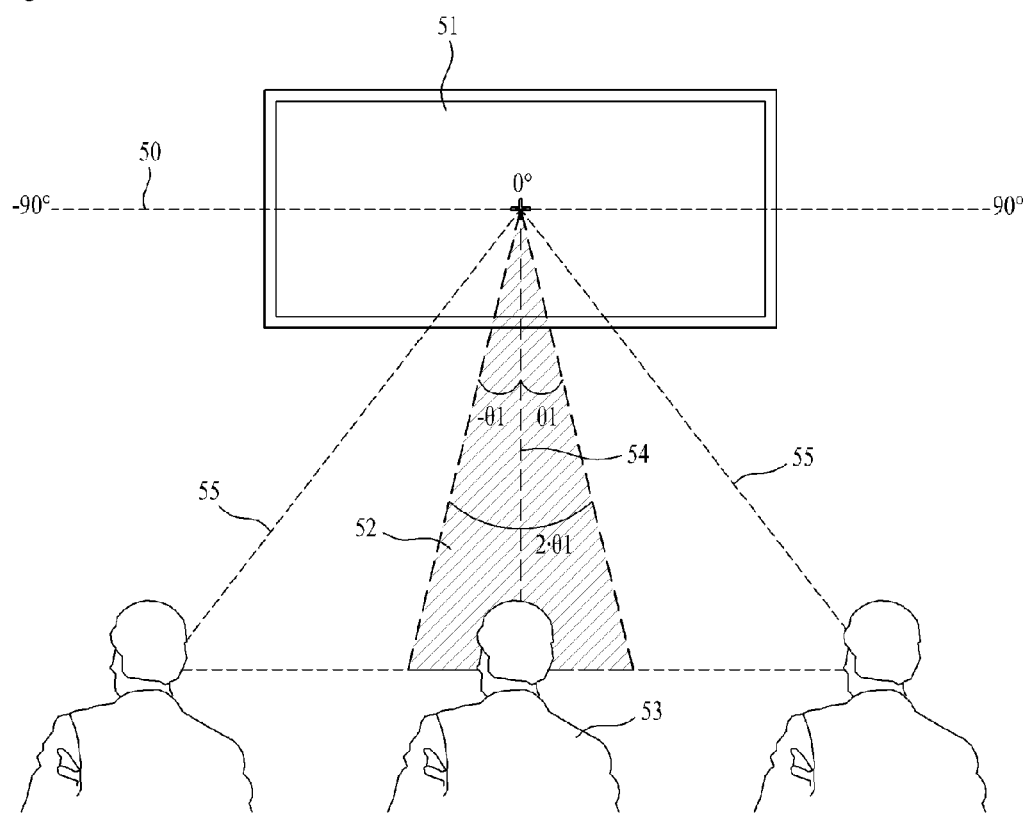
FIG. 5 is a diagram illustrating a 3D display device and a device, which controls an image in accordance with a horizontal angle of a user, in accordance with one embodiment of the present specification.

FIG. 5 is a diagram illustrating a 3D display device 51 and a device, which controls an image in accordance with a horizontal angle of a user, in accordance with one embodiment of the present specification. In more detail, FIG. 5 illustrates a horizontal angle component of a sweet spot 52 of the device 51. The horizontal angle between the device 51 and the user may be obtained from location information measured by the measurement unit.

As described above, the sweet spot 52 where 3D image may be viewed by the user may exist in front of the device 51. In more detail, a given horizontal angle range that may allow the user to recognize 3D image may exist at the front of the device 51. In this specification, the horizontal angle may mean a relative angle between the 3D display device 51 and the user 53 located along a horizontal axis 50 of the display. Alternatively, supposing that the device 51 and the user 53 are located on one horizontal plane, the horizontal angle may mean the horizontal angle between the device 51 and the user 53. According to one embodiment, if the location information of the user 53 is obtained as the face of the user 53 is recognized, the horizontal angle may mean the angle made by a first virtual line 55 from the center point of the 3D image to a center point of gravity of the face of the user 53 and a second virtual line 54 passing through the center point of the 3D image. According to another embodiment, if the location information of the user 53 is obtained as both eyes of the user 53 are recognized, the horizontal angle may mean the angle made by the first virtual line 55 from the center point of the 3D image to a center point of both eyes of the user 53 and the second virtual line 54 passing through the center point of the 3D image. In this case, the first virtual line 55 and the second virtual line 54 exist on the same horizontal plane. In addition, the horizontal angle between the user 53 and the 3D display device 51 may be measured in accordance with various manners and references without limitation to the aforementioned embodiments.

Supposing that the minimum value of the horizontal angle range of the sweet spot 52 is $-\theta 1$ and the maximum value of the horizontal angle range of the sweet spot 52 is $\theta 1$, if the user 53 is located within the angle range of $-\theta 1$ to $\theta 1$ from the device 51, the user 53 may view the 3D image. In other words, the device 51 may have the sweet spot horizontal angle range 52 of $2\theta 1$. $-\theta 1$ and $\theta 1$ may be fixed values in accordance with a design scheme of the device 51, or may be flexible values that may be set by the user 53. In this specification, $-\theta 1$ and $\theta 1$ are flexible values that may be set by the user 53, and the method for setting $-\theta 1$ and $\theta 1$ will be described later with reference to FIG. 11.

Figure 6:
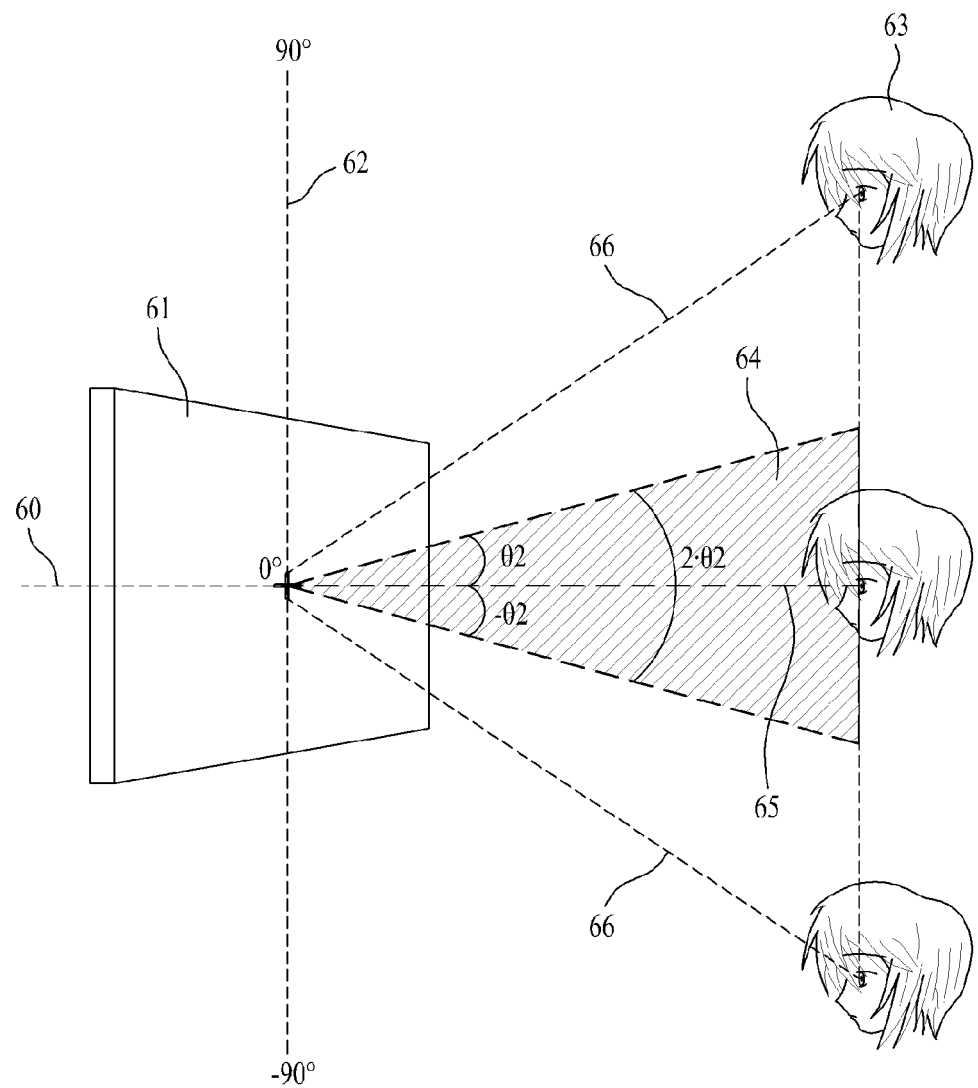
FIG. 6 is a diagram illustrating a 3D display device and a device, which controls an image in accordance with an elevation angle of a user, in accordance with one embodiment of the present specification.

FIG. 6 is a diagram illustrating a 3D display device 61 and a device, which controls an image in accordance with an elevation angle of a user, in accordance with one embodiment of the present specification. In more detail, FIG. 6 illustrates an elevation angle component of a sweet spot 64 of the device. The elevation angle between the device 61 and the user 63 may be obtained from location information measured by the measurement unit.

In this specification, the elevation angle may mean a relative angle between the 3D display device 61 and the location of the user 63 located along a vertical axis 62 of the display. Alternatively, supposing that the device 61 and the user 63 are located on one vertical plane, the elevation angle may mean the elevation angle between the device 61 and the user 63. According to one embodiment, if the location information of the user 63 is obtained as the face of the user 63 is recognized, the elevation angle may mean the angle made by a first virtual line 66 from the center point of the 3D image to a center point of gravity of the face of the user 63 and a second virtual line 65 passing through the center point of the 3D image. According to another embodiment, if the location information of the user 63 is obtained as both eyes of the user 63 are recognized, the elevation angle may mean the angle made by the first virtual line 66 from the center point of the 3D image to a center point of both eyes of the user 63 and the second virtual line 65 passing through the center point of the 3D image. In this case, the first virtual line 66 and the second virtual line 65 exist on the same vertical plane. In addition, the elevation angle between the user 63 and the 3D display device 61 may be measured in accordance with various manners and references without limitation to the aforementioned embodiments.

Supposing that the minimum value of the elevation angle range of the sweet spot 64 is $-\theta 2$ and the maximum value of the horizontal angle range of the sweet spot 64 is $\theta 2$, if the user 63 is located within the angle range of $-\theta 2$ to $\theta 2$ from the device, the user 63 may view the 3D image. In other words, the device 61 may have the sweet spot elevation angle range 64 of $2\theta 2$. $-\theta 2$ and $\theta 2$ may be fixed values in accordance with a design scheme of the device 61, or may be flexible values that may be set by the user 63. In this specification, $-\theta 2$ and $\theta 2$ are flexible values that may be set by the user 63, and the method for setting $-\theta 2$ and $\theta 2$ will be described later with reference to FIG. 11.

Figure 7:
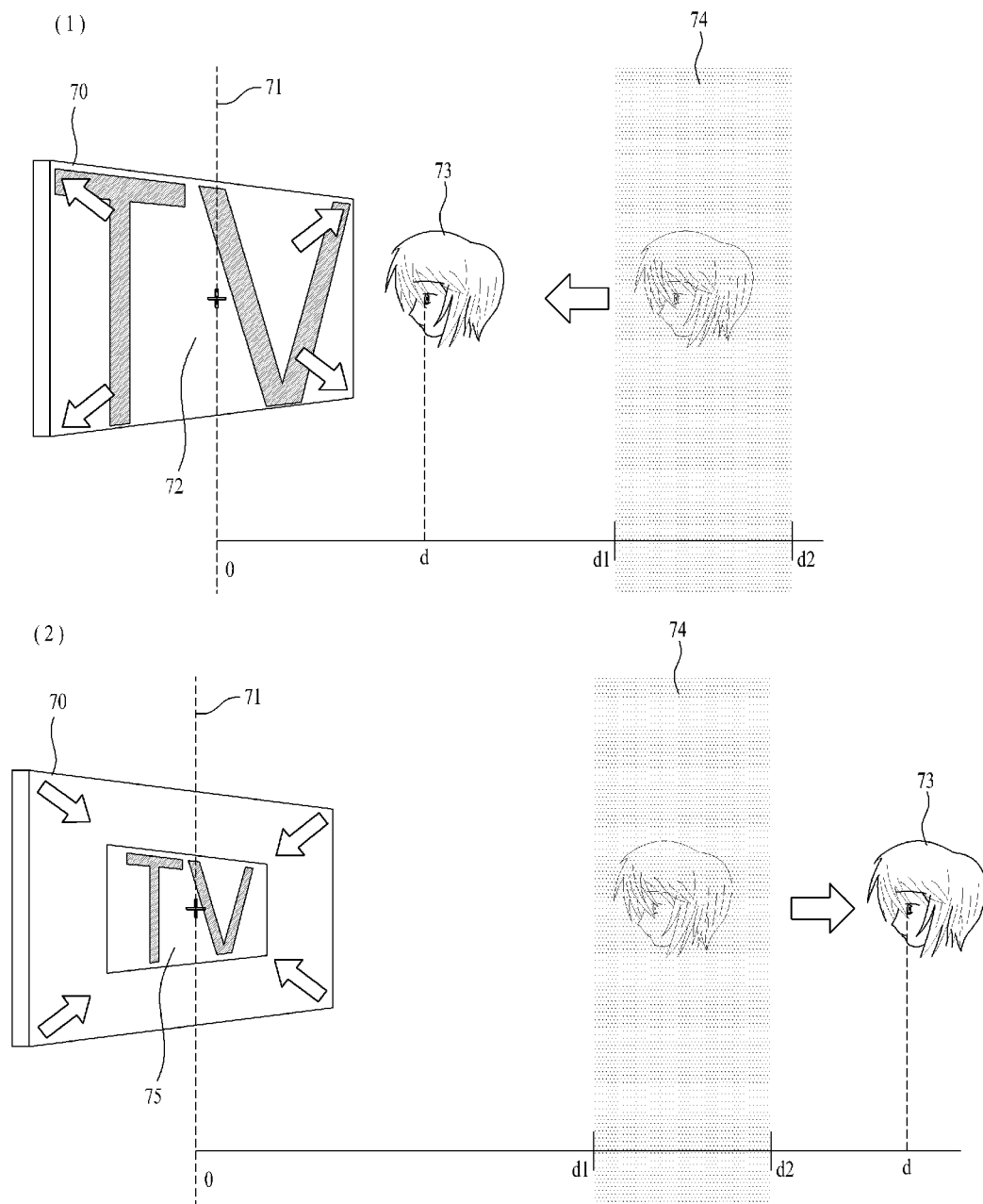
FIG. 7 is a diagram illustrating a 3D display device that controls a 3D image if a user departs from a distance range of a sweet spot in accordance with one embodiment of the present specification.

FIG. 7 is a diagram illustrating a 3D display device that controls a 3D image if a user 73 departs from a distance range of a sweet spot in accordance with one embodiment of the present specification.

The 3D display device 70 may have a given sweet spot distance range. In this case, the minimum value of the distance range may be referred to as d1, and the maximum value of the distance range may be referred to as d2. If the distance d between the user 73 and the device 70 is more than d1 and less than d2, that is, if the user 73 is located within the sweet spot distance range, the device 70 may maintain 3D image which is currently being displayed. However, if the distance d between the user 73 and the device 70 is less than d1 or more than d2, that is, if the user 73 departs from the sweet spot distance range, the device 70 may enlarge or reduce the 3D image which is currently being displayed.

In more detail, if the distance d between the user 73 and the device 70 is reduced to be less than the sweet spot distance range 74, the device 70 may enlarge the 3D image which is currently being displayed. In this case, reducing less than the sweet spot distance range 74 may mean that the distance d between the user 73 and the device 70 is reduced to be less than d1. In this case, d1 may mean the minimum value within the sweet spot distance range 74. The 3D image may be enlarged (72) fully or partially. Also, the 3D image may be enlarged to correspond to movement of the user 73. According to one embodiment, if the user departs from the sweet spot distance range 74 and closes to the device 70, the device 70 may control enlargement (72) speed of the 3D image according to the movement speed of the user 73. As the 3D image is enlarged, a corner portion of the 3D image may not be displayed. In this way, if a zone that may not be viewed by the user 73 as the 3D image is enlarged, since a viewing zone is limited partially, the user may feel inconvenience in viewing the 3D image. Accordingly, to solve such inconvenience, the user 73 may move to the sweet spot distance range 74 by changing his/her location to be far away from the device 70.

On the other hand, if the distance d between the user 73 and the device 70 is increased to be more than the sweet spot distance range 74, the device 70 may reduce the 3D image which is currently being displayed. In this case, increasing more than the sweet spot distance range 74 may mean that the distance d between the user 73 and the device 70 is increased to be more than d2. In this case, d2 may mean the maximum value within the sweet spot distance range 74. The 3D image may be reduced (75) fully or partially. Also, the 3D image may be reduced (75) to correspond to movement of the user 73. According to one embodiment, if the user 73 departs from the sweet spot distance range 74 and becomes far away from the device 70, the device 70 may control reducing (75) speed of the 3D image according to the movement speed of the user 73. As the 3D image is reduced, the user may feel inconvenience in viewing the 3D image. Accordingly, to solve such inconvenience, the user 73 may move to the sweet spot distance range 74 by changing his/her location to be close to the distance with the device 70.

As described above, in this embodiment, since the 3D image is enlarged/reduced in accordance with movement of the user 73, inconvenience of the user 73 is caused in viewing the 3D image, whereby it is guided that the user 73 may find out an optimized viewing point. As a result, it is advantageous in that a user interface, which is more institutive and ease, may be provided.

Figure 8:
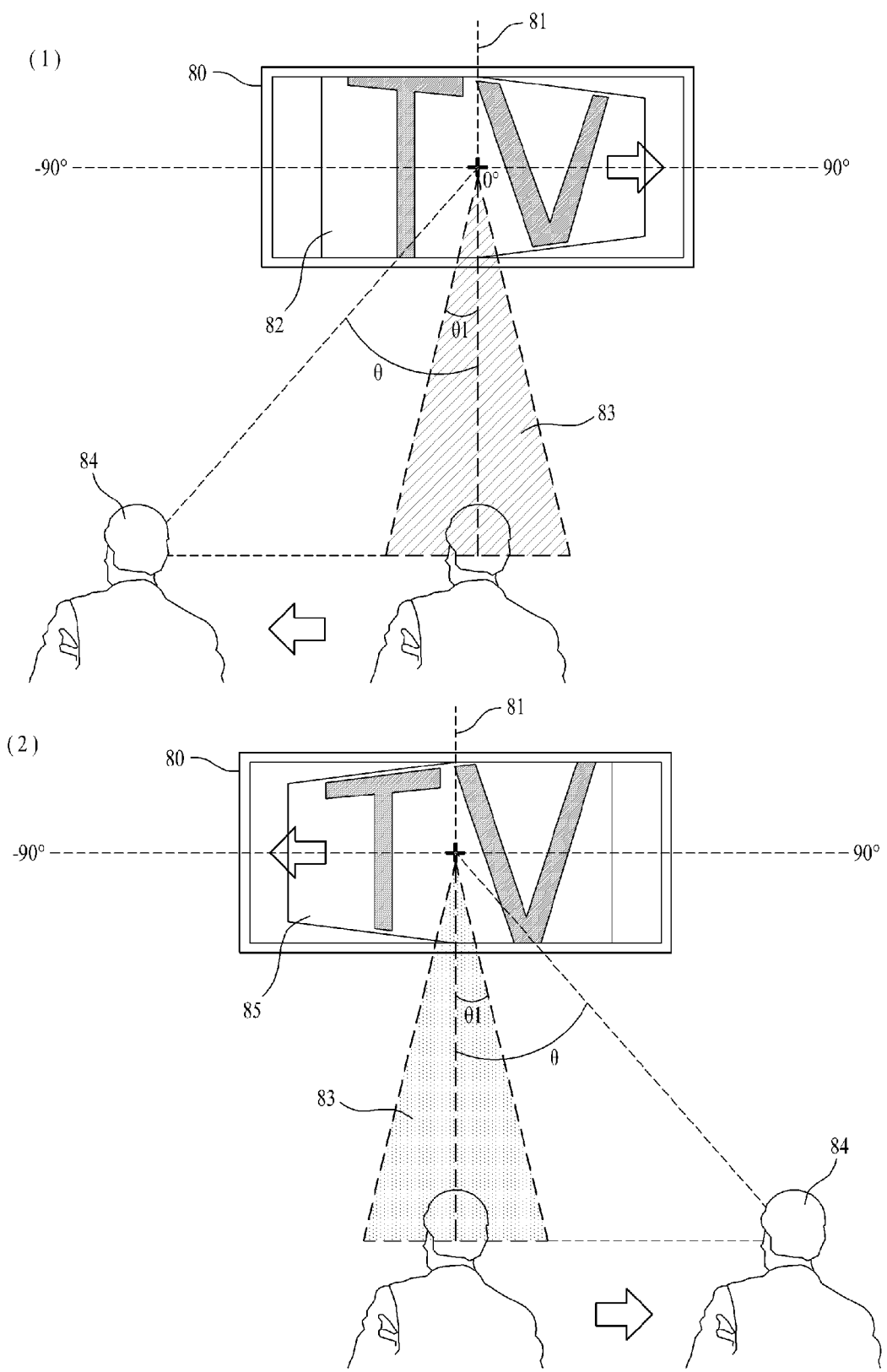
FIG. 8 is a diagram illustrating a 3D display device that controls a 3D image if a user departs from a horizontal angle range of a sweet spot in accordance with one embodiment of the present specification.

FIG. 8 is a diagram illustrating a 3D display device 80 that controls a 3D image if a user 84 departs from a horizontal angle range 83 of a sweet spot in accordance with one embodiment of the present specification.

The 3D display device 80 may have a given sweet spot horizontal angle range 83. If the user 84 is located within the sweet spot horizontal angle range 83, the device 80 may maintain the 3D image which is currently being displayed. On the other hand, if the user departs from the sweet spot horizontal angle range 83, the device 80 may rotate the 3D image, which is currently being displayed, based on a vertical axis of the image 81.

In more detail, if the horizontal angle between the user 84 and the device departs from the sweet spot angle range 83 in a left direction, the device 80 may rotate the 3D image, which is currently being displayed, in a right direction 82 based on the vertical axis of the image 81. On the other hand, if the horizontal angle between the user 84 and the device departs from the sweet spot angle range 83 in a right direction, the device 80 may rotate the 3D image, which is currently being displayed, in a left direction 85 based on the vertical axis of the image 81. In this case, the left direction and the right direction may mean the left side and the right side based on the direction towards which the user 84 views the device 80. In other words, the device 80 may rotate the 3D image in an opposite direction of the movement direction of the user 84. Since the 3D image is rotated in an opposite direction of the movement direction of the user 84, the user may feel inconvenience in viewing the 3D image by departing from the sweet spot 83. This is because that a viewing angle which is an angle for viewing the 3D image is not ensured. Accordingly, the user 84 may move to the sweet spot horizontal angle range 83 by changing his/her location to ensure the viewing angle of the 3D image. As described above, in this embodiment, since rotation of the 3D image is controlled in accordance with movement of the user 84, inconvenience of the user 84 is caused in viewing the 3D image, whereby it is guided that the user 84 may find out an optimized viewing point. As a result, it is advantageous in that a user interface, which is more institutive and ease, may be provided.

In the meantime, the 3D image may be rotated based on the vertical axis of the image 81, or may be rotated based on a vertical axis of the 3D display unit 81. Also, the 3D image may be rotated to correspond to movement of the user 84. According to one embodiment, if the user 84 departs from the sweet spot horizontal angle range 83, the device 80 may control the rotation speed of the 3D image according to the movement speed of the user 84. According to another embodiment, if the user 84 departs from the sweet spot horizontal angle range 83, the device 80 may rotate the 3D image as much as the difference between the horizontal angle θ between the user 84 and the device 80 and the horizontal angle of the sweet spot θ1.

Figure 9:
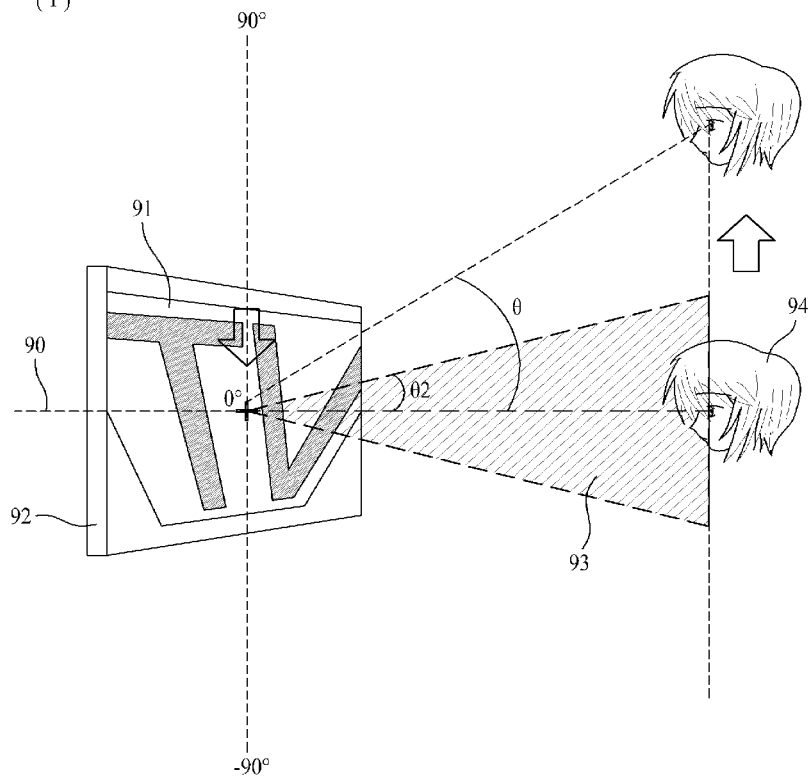
FIG. 9 is a diagram illustrating a 3D display device that controls a 3D image if a user departs from an elevation angle range of a sweet spot in accordance with one embodiment of the present specification.
Figure 9:
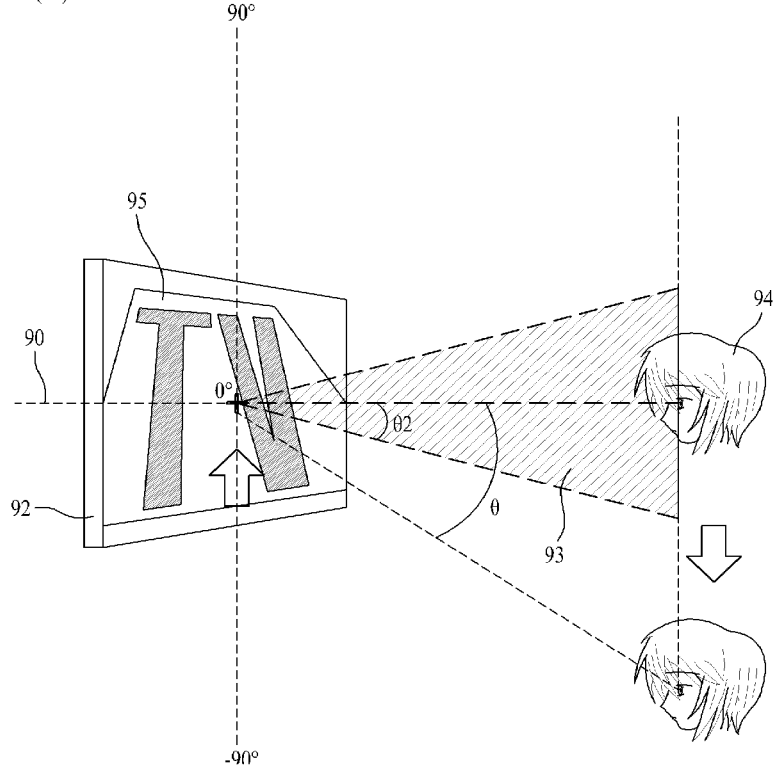

FIG. 9 is a diagram illustrating a 3D display device 92 that controls a 3D image if a user 94 departs from an elevation angle range of a sweet spot in accordance with one embodiment of the present specification.

The 3D display device 92 may have a given sweet spot elevation angle range 93. If the user 94 is located within the sweet spot elevation angle range 93, the device 92 may maintain the 3D image which is currently being displayed. On the other hand, if the user 94 departs from the sweet spot elevation angle range 93, the device 92 may rotate the 3D image which is currently being displayed, based on a horizontal axis of the image 90.

In more detail, if the elevation angle between the user 94 and the device 92 departs from the sweet spot angle range 93 in an upward direction, the device 92 may rotate the 3D image, which is currently being displayed, in a downward direction 91 based on the horizontal axis of the image. On the other hand, if the elevation angle between the user 94 and the device 92 departs from the sweet spot angle range 93 in a downward direction, the device 92 may rotate the 3D image, which is currently being displayed, in an upward direction 95 based on the horizontal axis of the image 90. In other words, the device 92 may rotate the 3D image in an opposite direction of the movement direction of the user 94. Since the 3D image is rotated in an opposite direction of the movement direction of the user 94, the user 94 may feel inconvenience in viewing the 3D image by departing from the sweet spot. This is because that a viewing angle which is an angle for viewing the 3D image is not ensured. Accordingly, the user 94 may move to the sweet spot elevation angle range 93 by changing his/her location to ensure the viewing angle of the 3D image. As described above, in this embodiment, since rotation of the 3D image is controlled in accordance with movement of the user 94, inconvenience of the user 94 is caused in viewing the 3D image, whereby it is guided that the user 94 may find out an optimized viewing point. As a result, it is advantageous in that a user interface, which is more institutive and ease, may be provided.

In the meantime, the 3D image may be rotated based on the horizontal axis of the image 90, or may be rotated based on the horizontal axis of the 3D display unit 90. Also, the 3D image may be rotated to correspond to movement of the user 94. According to one embodiment, if the user 94 departs from the sweet spot elevation angle range 93, the device 92 may control the rotation speed of the 3D image according to the movement speed of the user 94. According to another embodiment, if the user 94 departs from the sweet spot elevation angle range, the device 92 may rotate the 3D image as much as the difference between the elevation angle θ between the user 94 and the device 92 and the elevation angle θ2 of the sweet spot.

Figure 10:
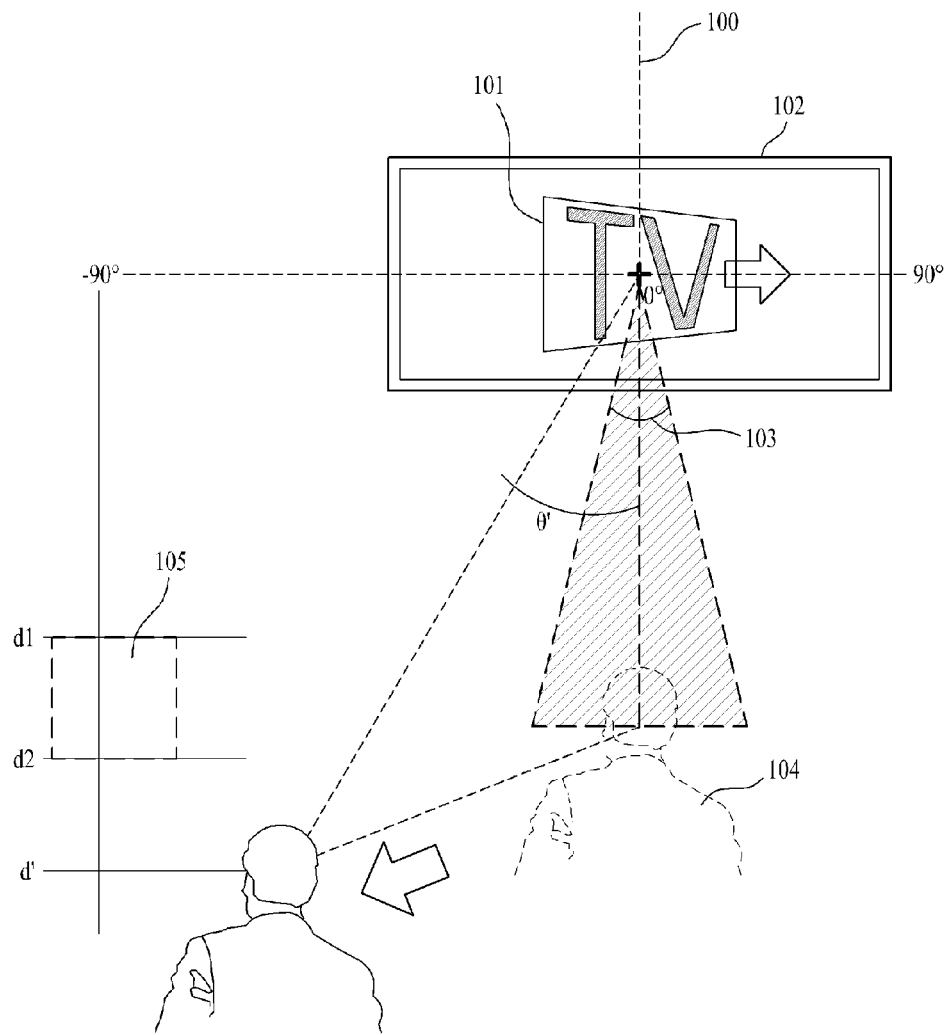
FIG. 10 is a diagram illustrating a 3D display device if a user departs from a distance range and a horizontal angle range of a sweet spot in accordance with one embodiment of the present specification.

FIG. 10 is a diagram illustrating a 3D display device if a user 104 departs from a distance range and a horizontal angle range of a sweet spot in accordance with one embodiment of the present specification.

As described above, the sweet spots 103 and 105 may include a distance component (axis x) 105 and a horizontal angle component (axis y) 103. Also, the sweet spots 103 and 105 may further include an elevation angle component (axis z) in accordance with one embodiment. The aforementioned embodiments relate to the case where the 3D image is controlled by any one of the components of the sweet spots 103 and 105. However, it is uncommon that the user 104 actually moves to change any one of the components of the sweet spots 103 and 105. Accordingly, in this embodiment, in case where two or more components of sweet spots 103 and 105 are changed at the same time, a method for controlling a 3D image will be described.

First of all, the device 102 may generate location information of the user 104 by measuring the location of the user 104. The location information may include relative location information between the user 104 and the device 102 and absolute location information of the user 104.

The device 102 may obtain a distance component (axis x) d' and a horizontal angle component (axis y) θ' from the location information. Also, the device 102 may additionally obtain the elevation angle component in accordance with one embodiment. For example, after obtaining a vector value in a movement direction of the user 104, the device 102 may obtain each component value by decomposing the vector value into the distance component (axis x) d', the horizontal angle component (axis y) θ' and the elevation angle component (axis z). As described with reference to FIG. 7 to FIG. 9, the device 102 may rotate or enlarge/reduce the 3D image in accordance with the decomposed component value. However, unlike the aforementioned embodiments described with reference to FIG. 7 to FIG. 9, in this embodiment, rotation and enlargement/reducing of the 3D image may be performed at the same time.

In more detail, as described with reference to the drawings, if the user 104 moves in a diagonal direction by departing from the distance range 105 and the horizontal angle range 103 of the sweet spot, the device may measure a vector value in a movement direction of the user 104. The device 102 may obtain the distance component (axis x) d' and the horizontal angle component (axis y) θ' from the measured vector value. The device 102 may control the 3D image in accordance with the obtained component values. In more detail, the device 102 may enlarge/reduce the 3D image in accordance with the distance component value d'. Also, the device 102 may display the 3D image by rotating the 3D image using the vertical center line 100 as an axis in accordance with the horizontal component value θ'. The 3D image may be controlled simultaneously in accordance with the respective component values. For example, if the obtained distance component d' is more than the sweet spot distance range 105 and the obtained horizontal angle component θ' corresponds to the left side of the sweet spot angle range 103, the device 102 may rotate (101) the reduced 3D image towards the right side based on the vertical axis of the image 100. Alternatively, if the obtained distance component d' is more than the sweet spot distance range 105 and the obtained horizontal angle component θ' corresponds to the right side of the sweet spot angle range 103, the device 102 may rotate the reduced 3D image towards the left side based on the vertical axis of the image 100.

In this way, the device 102 may control the 3D image in accordance with each component value by decomposing the movement direction of the user 104 into each component value. In this embodiment, although the case where the distance component d' and the horizontal angle component θ' exists only has been described in detail, the elevation angle component may be added in accordance with one embodiment. In this case, the device 102 may decompose the vector value in the movement direction of the user 104 into the distance component d', the horizontal angle component θ' and the elevation angle component and control the 3D image at the same time in accordance with each component. For example, if the obtained distance d' is less than the sweet spot distance range 105, the obtained horizontal angle component θ' corresponds to the left side of the sweet spot horizontal angle range 103 and the obtained elevation angle component corresponds to the upper side of the sweet spot angle range, the device 102 may rotate the enlarged 3D image towards the right side based on the vertical axis of the image 100 and towards the lower side based on the horizontal axis of the image.

Figure 11A:
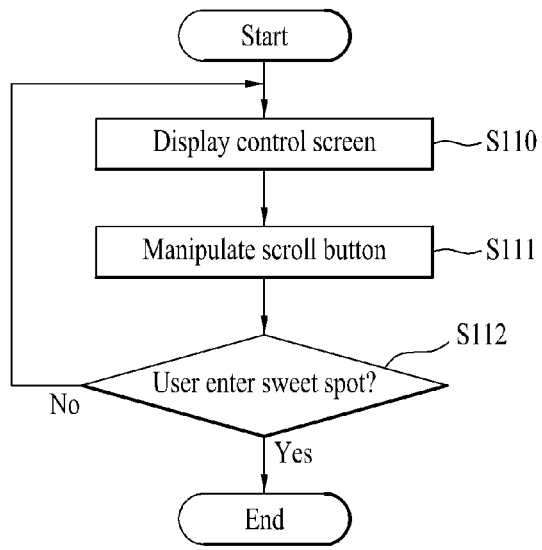
FIG. 11a is a flow chart illustrating a method for setting a sweet spot range if the sweet spot range is set by a user in accordance with one embodiment of the present specification.

FIG. 11a is a flow chart illustrating a method for setting a sweet spot range if the sweet spot range is set by a user in accordance with one embodiment of the present specification. If the user sets an option or desires to reset a sweet spot before using the purchased 3D display device, the user may set the sweet spot in accordance with the flow chart of FIG. 11a.

First of all, if the power is supplied to the 3D display device, the device may display a control screen (S110).

In this case, the control screen means the 3D image controlled in accordance with a current location of the user. In more detail, if the current location of the user is within the sweet spot range, the control screen may mean the 3D image which is not enlarged/reduced. However, if the current location of the user departs from the sweet spot range, the control screen may mean the 3D image rotated or enlarged/reduced in accordance with a location component of the user. For example, if the distance between the user and the device is less than the sweet spot distance range, the control screen may mean the 3D image which is enlarged. Accordingly, the user may determine whether the current location of the user is within the sweet spot range, through the control screen which is displayed.

If the current location of the user departs from the sweet spot range, the user may set its current location to the sweet spot by manipulating a scroll button (S111).

For example, if the displayed control screen corresponds to the enlarged 3D image, the user may reduce the 3D image by manipulating the scroll button downwardly. On the other hand, if the displayed control screen corresponds to the reduced 3D image, the user may enlarge the 3D image by manipulating the scroll button upwardly. Even in case of the 3D image of which displayed control screen is rotated towards the left side or right side, the user may control rotation of the 3D image by manipulating the scroll button in a left or right direction. In other words, the user may simply set the current location of the user to the sweet spot by manipulating the scroll button. In this case, since the installation point of the device may be varied depending on the structure of building, if the sweet spot range is fixed, utility of the device may be deteriorated. Accordingly, the user may set the sweet spot range to enhance utility of the device. Meanwhile, as a method for manipulating the sweet spot, the aforementioned manipulation of the scroll button is only exemplary, and the sweet spot may be manipulated by various user inputs such as a button input of a remote controller or a touch input of the user. In other words, the manipulation of the scroll button is not limited to the aforementioned embodiment.

Next, if the user enters the sweet spot range through manipulation of the scroll button, the device may store the set sweet spot detail, and the process for setting the sweet spot may end. However, if the user does not enter the sweet spot range, the step may return to the step of displaying the control screen (S112).

Figure 11B:
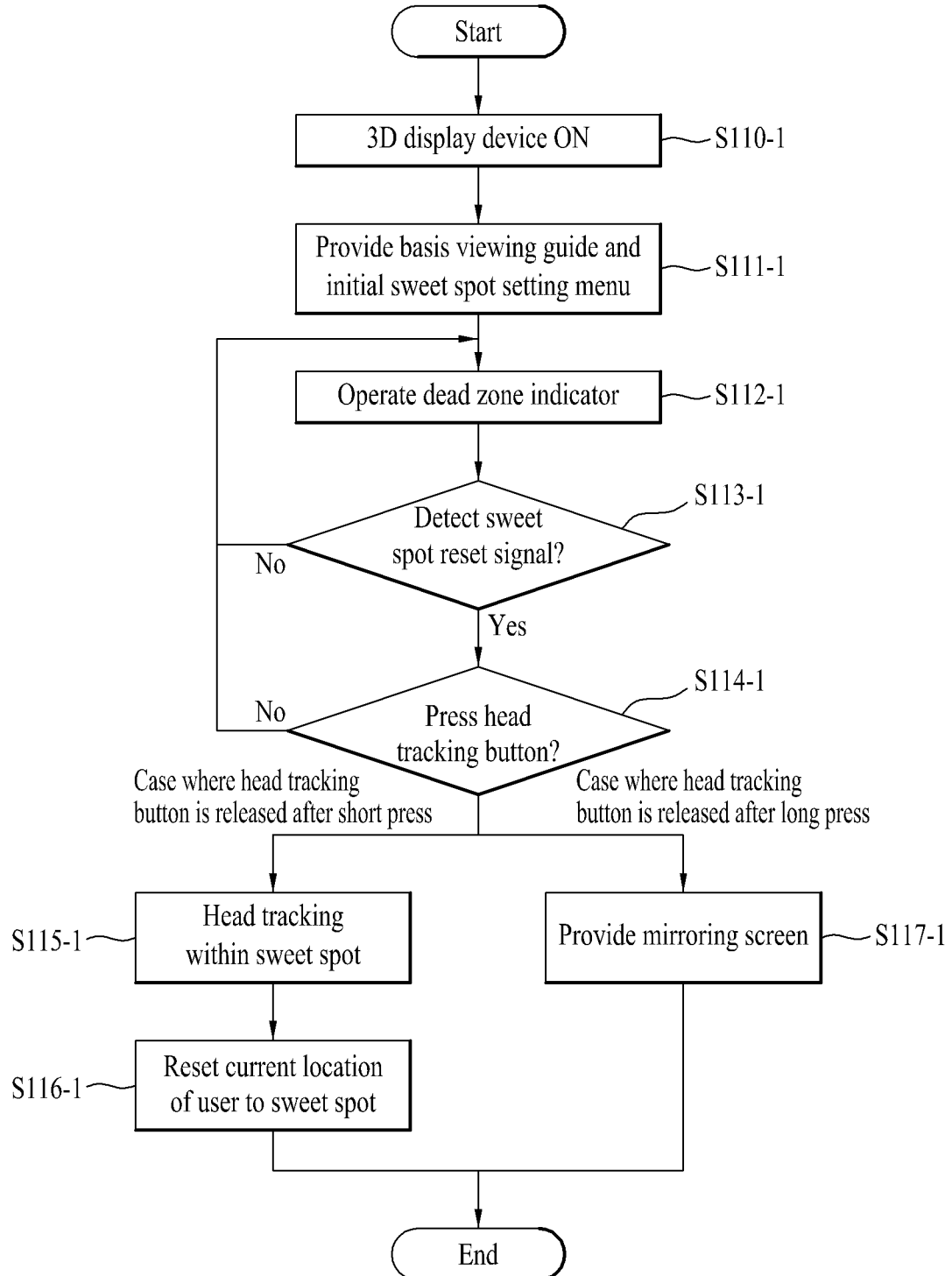
FIG. 11b is a flow chart illustrating a setting order of a sweet spot in accordance with one embodiment of the present specification.

FIG. 11b is a flow chart illustrating a setting order of a sweet spot in accordance with one embodiment of the present specification. In more detail, FIG. 11b is a flow chart illustrating the order of resetting a preset sweet spot in accordance with a location of a user.

If the power is supplied to the 3D display device (S110-1), the device may display a basis viewing guide screen (S111-1).

The basic viewing guide screen means the screen for suggesting a guide for a method for entering a sweet spot together with a simple guide of setting of a sweet spot. Also, the device may provide a sweet spot setting menu together with a basis viewing guide (S111-1).

In this case, the sweet spot setting menu means a user interface provided by the device to allow the user to set a sweet spot, and may be set by the method described in FIG. 11a. If the sweet spot is set in accordance with FIG. 11a, a dead zone indicator may be operated (S112-1).

In this case, the dead zone means the zone that excludes the sweet spot of the viewing zone in front of the device. Functions of the dead zone indicator correspond to those of the aforementioned embodiments in FIG. 7 to FIG. 10.

The device in which the dead zone indicator is being implemented may determine whether a sweet spot reset signal is detected (S113-1).

Reset of the sweet spot is the function provided by the device to change the preset sweet spot on the basis of the current location of the user. The sweet spot reset signal may mean a user input signal by the user to reset the sweet spot. This sweet spot reset signal may be generated by various manners such as a button press of a remote controller, a touch input for display of the user, and location change that departs from the sweet spot range of the user.

If the sweet spot reset signal is detected, the device may determine whether a head tracking button is pressed (S114-1).

If press of the head tracking button is not detected, the device may return to the step for operation of the dead zone indicator (S112-1).

If press of the head tracking button is detected, the device may perform different functions in accordance with duration time of press of the head tracking button. In this case, the head tracking button is a specific button existing in a remote controller synchronized with the device, and may perform a function of tracing a face of the user.

In more detail, if the duration time of press of the head tracking button is less than preset time, the device may trace the location of the face of the user within the sweet spot (S115-1). The device may obtain location information of the user by tracing the face of the user. The device may reset the current location of the user to a new sweet spot by using the obtained location information (S116-1). After the device stores setting details of the new sweet spot, the process for resetting the sweet spot may end.

If the duration time of press of the head tracking button exceeds the preset time, the device may provide a mirroring screen for the location of the user during the duration time of press of the button (S117-1). In more detail, the device may display a feature of the user located in front of the display unit by mirroring the feature of the user. If the device mirrors the user, it may use the camera used as the measurement unit. The device may mirror the feature of the user and provide information on whether the user is currently located within the sweet spot range by displaying the sweet spot range additionally. Accordingly, the user may determine whether the user is currently located within the sweet spot range. The user was conventionally required to search for a setting menu provided by the device so as to implement a mirroring function. However, in this embodiment, the mirroring function is performed through long press of the head tracking button, whereby accessibility and utility may be enhanced at the same time. If the head tracking button is released after long press, mirroring may end.

Figure 12A:
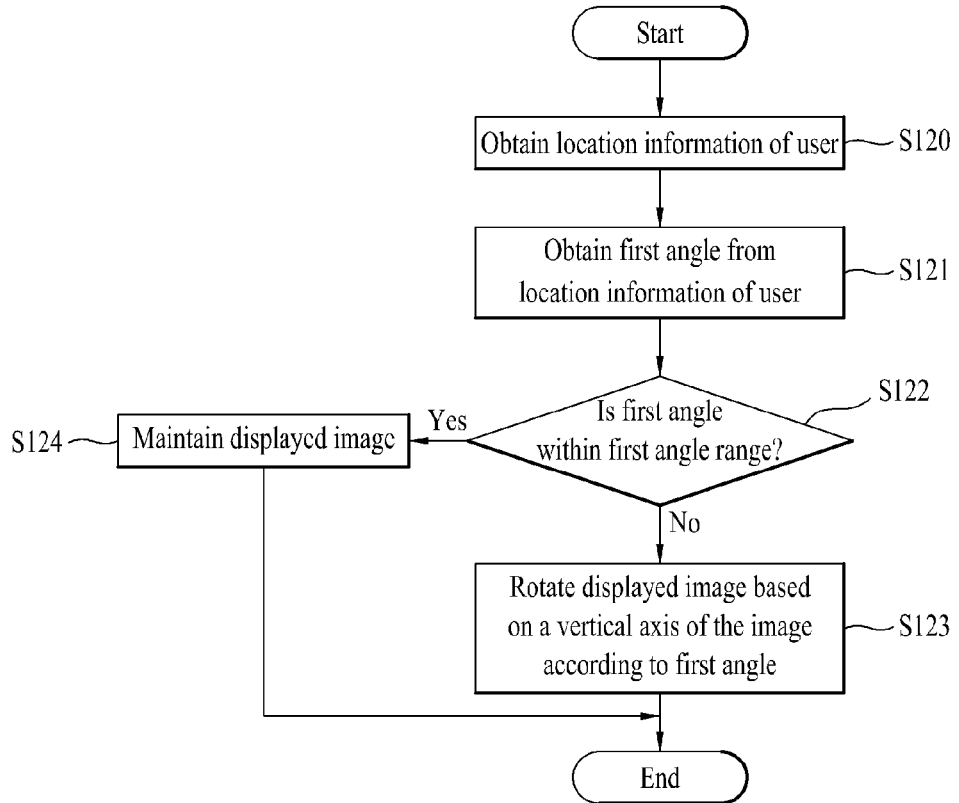
FIG. 12a is a flow chart illustrating a method for controlling a device if an angle of a user and the device departs from an angle range of a sweet spot.
Figure 12A:
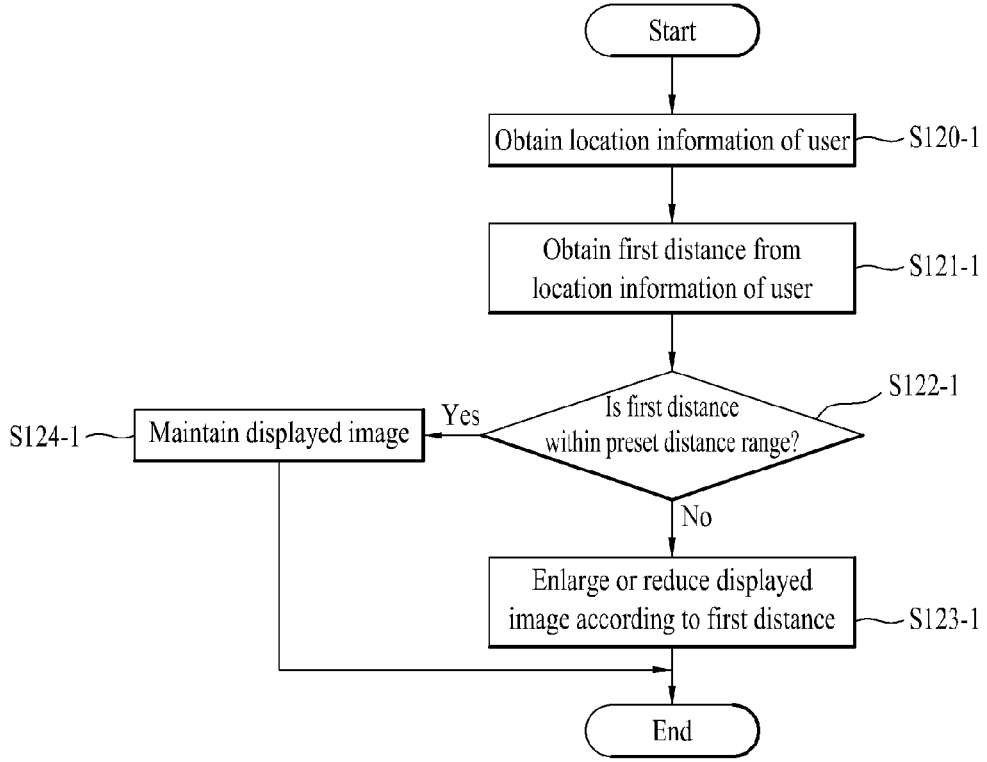

FIG. 12a is a flow chart illustrating a method for controlling a device if an angle of a user and the device departs from an angle range of a sweet spot. This flow chart is the same as or corresponds to the embodiment described with reference to FIG. 8.

First of all, the device may obtain location information of the user (S120).

Also, the device may obtain a first angle, which is a horizontal angle of the user and the device, from the location information of the user (S121).

Next, the device may determine whether the first angle is within a first angle range which is a preset horizontal angle range (S122).

If the first angle is within the first angle range, the device may maintain 3D image which is currently being displayed (S124).

However, if the first angle departs from the first angle range, the device may rotate the displayed image in accordance with a change direction of the first angle based on a vertical axis of the image (S123). In more detail, if the first angle departs from the first angle range and then moves to the left side, the device may rotate the 3D image towards the right side based on the vertical axis of the image. By contrast, if the first angle departs from the first angle range and then moves to the right side, the device may rotate the 3D image towards the left side based on the vertical axis of the image. More details of this control operation of the device correspond to or are the same as the embodiment described with reference to FIG. 8.

This flow chart may be applied to another embodiment related to the elevation angle.

First of all, the device may obtain location information of the user (S120).

Also, the device may obtain a first angle, which is an elevation angle of the user and the device, from the location information of the user (S121).

Next, the device may determine whether the first angle is within a first angle range which is a preset elevation angle range (S122).

If the first angle is within the first angle range, the device may maintain 3D image which is currently being displayed (S124).

However, if the first angle departs from the first angle range, the device may rotate the displayed image in accordance with a change direction of the first angle based on a horizontal axis of the image (S123).

In more detail, if the first angle departs from the first angle range and then moves to the upper side, the device may rotate the 3D image towards the lower side based on the horizontal axis of the image. By contrast, if the first angle departs from the first angle range and then moves to the lower side, the device may rotate the 3D image towards the upper side based on the horizontal axis of the image. More details of this control operation of the device correspond to or are the same as the embodiment described with reference to FIG. 9.

FIG. 12b is a flow chart illustrating a method for controlling a device if an angle of a user and the device departs from a distance range of a sweet spot.

First of all, the device may obtain location information of the user (S120-1).

Also, the device may obtain a first distance, which is the distance between the user and the device, from the location information of the user (S121-1).

Next, the device may determine whether the first angle within a preset distance range (S122-1).

If the first distance is within the preset distance range, the device may maintain the 3D image which is currently being displayed (S124-1).

However, if the first distance departs from the preset distance range, the device may enlarge or reduce the displayed image in accordance with a change direction of the first distance (S123-1).

In more detail, if the first distance is reduced and thus departs from the preset distance range, the device may enlarge the 3D image. On the other hand, if the first distance is increased and thus departs from the preset distance range, the device may reduce the 3D image. More details of this control operation of the device correspond to or are the same as the embodiment described with reference to FIG. 7.

For convenience of description, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present specification.

Also, the device and the method for controlling the same according to the embodiment are not limited to the aforementioned embodiments, and all or some of the aforementioned embodiments may selectively be configured in combination so that various modifications may be made in the aforementioned embodiments.

It will be apparent to those skilled in the art that the present specification can be embodied in other specific forms without departing from the spirit and essential characteristics of the specification. Thus, the above embodiments are to be considered in all respects as illustrative and not restrictive. The scope of the invention should be determined by reasonable interpretation of the appended claims and all change which comes within the equivalent scope of the invention are included in the scope of the invention.

Also, in this specification, it is to be understood that distance, length, speed and angle may mean their exact value and include substantial distance, length, speed and angle of a given range. In other words, in this specification, the distance and angle between the device and the user may mean substantial distance and angle, and an error of a given range may exist therein.

In this specification, both the product invention and the method invention have been described, and description of both inventions may be made complementally if necessary.

MODE FOR THE INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described above, the present invention is totally or partially applicable to electronic devices.

The invention claimed is:

1. A 3-dimensional (3D) display device comprising:
a 3D display unit;
a measurement unit configured to obtain location information indicating a location of a user located in front of the 3D display unit; and
a processor configured to control the 3D display unit and the measurement unit,
wherein the processor is further configured to:
obtain a first angle, which is a horizontal angle between the 3D display unit and the user, by using the location information,
maintain an image displayed on the 3D display unit if the first angle is within a preset first angle range, and rotate the image displayed on the 3D display unit based on a vertical axis of the image and in a left or right direction according to the first angle if the first angle departs from the preset first angle range in order to provide guidance for the user to move to a location in which the first angle is within the preset first angle range.

2. The 3D display device according to claim 1, wherein the location of the user includes a face location of the user, and the measurement unit obtains the location information indicating the face location of the user located in front of the 3D display unit.

3. The 3D display device according to claim 1, wherein the location of the user includes a location of both eyes of the user, and the measurement unit obtains the location information indicating the location of both eyes of the user located in front of the 3D display unit.

4. The 3D display device according to claim 1, wherein if the first angle is changed and departs from the preset first angle range, the processor rotates the image displayed on the 3D display unit based on the vertical axis of the image and in an opposite direction of a change direction of the first angle according to the change of the first angle.

5. The 3D display device according to claim 1, wherein the processor obtains a second angle, which is an elevation angle between the 3D display unit and the user, by using the location information,
    maintains the image displayed on the 3D display unit if the second angle is within a preset second angle range, and
    rotates the image displayed on the 3D display unit based on a horizontal axis of the image and in an upper or lower direction according to the second angle if the second angle departs from the preset second angle range.

6. The 3D display device according to claim 5, wherein if the second angle is changed and departs from the preset second angle range, the processor rotates the image displayed on the 3D display unit based on the horizontal axis of the image and in an opposite direction of a change direction of the second angle according to the change of the second angle.

7. The 3D display device according to claim 1, wherein the processor obtains a first distance, which is a distance between the 3D display unit and the user, by using the location information, maintains the image displayed on the 3D display unit if the first distance is within a preset distance range, and enlarges or reduces the image displayed on the 3D display unit according to the first distance if the first distance departs from the preset distance range.

8. The 3D display device according to claim 7, wherein the processor enlarges the image displayed on the 3D display unit according to a change of the first distance if the first distance is reduced to be less than the preset distance range, and reduces the image displayed on the 3D display unit according to the change of the first distance if the first distance is increased to be more than the preset distance range.

9. A 3-dimensional (3D) display device comprising:
    a 3D display unit;
    a measurement unit configured to obtain location information indicating a location of a user located in front of the 3D display unit; and
    a processor configured to control the 3D display unit and the measurement unit,
    wherein the processor is further configured to:
        obtain a first distance, which is a distance between the 3D display unit and the user, by using the location information,
        maintain an image displayed on the 3D display unit if the first distance is within a preset distance range, and
        enlarge or reduce the image displayed on the 3D display unit according to the first distance if the first distance departs from the preset distance range in order to provide guidance for the user to move to a location in which the first distance is within the preset distance range.

10. The 3D display device according to claim 9, wherein the location of the user includes a face location of the user, and the measurement unit obtains the location information indicating the face location of the user located in front of the 3D display unit.

11. The 3D display device according to claim 9, wherein the location of the user includes a location of both eyes of the user, and the measurement unit obtains the location information indicating the location of both eyes of the user located in front of the 3D display unit.

12. The 3D display device according to claim 9, wherein if the first distance is reduced to be less than the preset distance range, the processor enlarges the image displayed on the 3D display unit, and if the first distance is increased to be more than the preset distance range, the processor reduces the image displayed on the 3D display unit.

13. The 3D display device according to claim 9, wherein the processor obtains a first angle, which is a horizontal angle between the 3D display unit and the user, by using the location information,
    maintains the image displayed on the 3D display unit if the first angle is within a preset first angle range, and
    rotates the image displayed on the 3D display unit based on a vertical axis of the image and in a left or right direction according to the first angle if the first angle departs from the preset first angle range.

14. The 3D display device according to claim 13, wherein, if the first angle is changed and departs from the preset first angle range, the processor rotates the image displayed on the 3D display unit based on the vertical axis of the image and in an opposite direction of a change direction of the first angle according to the change of the first angle.

15. The 3D display device according to claim 9, wherein the processor obtains a second angle, which is an elevation angle between the 3D display unit and the user, by using the location information,
    maintains the image displayed on the 3D display unit if the second angle is within a preset second angle range, and
    rotates the image displayed on the 3D display unit based on a horizontal axis of the image and in an upper or lower direction according to the second angle if the second angle departs from the preset second angle range.

16. The 3D display device according to claim 15, wherein if the second angle is changed and departs from the preset second angle range, the processor rotates the image displayed on the 3D display unit based on the horizontal axis of the image and in an opposite direction of a change direction of the second angle according to the change of the second angle.

17. A method for controlling a 3D display device, the method comprising the steps of:
    obtaining, via a measurement unit, location information indicating a location of a user located in front of a 3D display unit;

obtaining, via a processor, a first angle, which is a horizontal angle between the 3D display unit and the user, by using the location information;

maintaining, via the processor, an image displayed on the 3D display unit if the first angle is within a preset first angle range, and rotating, via the processor, the image displayed on the 3D display unit based on a vertical axis of the image and in a left or right direction according to the first angle if the first angle departs from the preset first angle range in order to provide guidance for the user to move to a location in which the first angle is within the preset first angle range.

18. The method according to claim 17, further comprising the steps of:

obtaining, via the processor, a second angle, which is an elevation angle between the 3D display unit and the user, by using the location information;

maintaining, via the processor, the image displayed on the 3D display unit if the second angle is within a preset second angle range, and rotating, via the processor, the image displayed on the 3D display unit based on a horizontal axis of the image and in an upper or lower direction according to the second angle if the second angle departs from the preset second angle range.

19. A method for controlling a 3D display device, the method comprising the steps of:

obtaining, via a measurement unit, location information indicating a location of a user located in front of a 3D display unit;

obtaining, via a processor, a first distance, which is a distance between the 3D display unit and the user, by using the location information;

maintaining, via the processor, an image displayed on the 3D display unit if the first distance is within a preset distance range, and enlarging or reducing, via the processor, the image displayed on the 3D display unit, according to the first distance if the first distance departs from the preset distance range in order to provide guidance for the user to move to a location in which the first distance is within the preset distance range.

\* \* \* \* \*